(12) United States Patent
Sakaue et al.

(10) Patent No.: US 7,376,070 B2
(45) Date of Patent: May 20, 2008

(54) OPTICAL INFORMATION RECORDING MEDIUM AND METHOD FOR MANUFACTURING THE MEDIUM

(75) Inventors: Yoshitaka Sakaue, Hirakata (JP); Kenichi Nishiuchi, Hirakata (JP); Ken'ichi Nagata, Nishinomiya (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 744 days.

(21) Appl. No.: 10/995,155

(22) Filed: Nov. 24, 2004

(65) Prior Publication Data
US 2005/0122888 A1 Jun. 9, 2005

(30) Foreign Application Priority Data
Dec. 8, 2003 (JP) ............................ 2003-408594

(51) Int. Cl.
*G11B 7/24* (2006.01)
(52) U.S. Cl. .................. 369/275.3; 369/275.4
(58) Field of Classification Search ................ 369/282, 369/290.1, 116, 47.51, 47.5, 275.2; 720/723; 430/270.11, 270.13
See application file for complete search history.

(56) References Cited

U.S. PATENT DOCUMENTS

| | | | | |
|---|---|---|---|---|
| 5,832,190 A * | 11/1998 | Terajima et al. | ............ | 358/1.14 |
| 6,894,962 B1 * | 5/2005 | Nishiuchi et al. | ......... | 369/47.51 |
| 6,938,162 B1 * | 8/2005 | Nagai et al. | ................ | 713/189 |
| 6,973,015 B1 * | 12/2005 | Murakami et al. | ....... | 369/47.21 |
| 7,154,841 B2 * | 12/2006 | Sakaue et al. | ........... | 369/275.2 |
| 7,239,601 B2 * | 7/2007 | Sato et al. | ................ | 369/275.3 |
| 2002/0172123 A1 * | 11/2002 | Ohmi | ....................... | 369/59.25 |
| 2003/0063530 A1 * | 4/2003 | Takehara et al. | ......... | 369/44.23 |
| 2003/0174602 A1 * | 9/2003 | Abe et al. | .................. | 369/47.4 |
| 2003/0214892 A1 * | 11/2003 | Lee et al. | ................ | 369/53.26 |
| 2004/0142277 A1 * | 7/2004 | Akutsu et al. | ......... | 430/270.13 |

FOREIGN PATENT DOCUMENTS

| | | |
|---|---|---|
| EP | 0 848 379 | 6/1998 |
| EP | 1 152 402 | 11/2001 |
| EP | 1 286 242 | 2/2003 |
| EP | 1 650 750 | 4/2006 |
| JP | 2000-36130 | 2/2000 |
| JP | 2002-260307 | 9/2002 |
| WO | 98/58368 | 12/1998 |

\* cited by examiner

*Primary Examiner*—Hoa T. Nguyen
*Assistant Examiner*—Henok Heyi
(74) *Attorney, Agent, or Firm*—Wenderoth, Lind & Ponack, L.L.P.

(57) ABSTRACT

A method for appropriately performing initialization of an optical information recording medium is provided, in which an initialization process is prevented from stopping so that yield from manufacturing the optical information recording medium is improved. In the initialization of an information layer with a burst cutting area (hereinafter referred to as "BCA"), at least one of the initialization conditions including a laser power, a linear speed, and a focal point of the laser beam for the information layer is changed between the BCA region and a data area that is an area for recording and reproducing information. In the initialization of an information layer without the BCA, at least one of the initialization conditions including a laser power, a linear speed, a focal point of the laser beam for the information layer and a feed pitch is changed between the area corresponding to the BCA and the area corresponding to the data area.

32 Claims, 4 Drawing Sheets

OPTICAL INFORMATION RECORDING MEDIUM AND METHOD FOR MANUFACTURING THE MEDIUM

BACKGROUND OF THE INVENTION

1. Field of the Invention

The present invention relates to an optical information recording medium for recording and reproducing information by using optical means such as a laser beam, and a method for manufacturing the medium.

2. Description of the Prior Art

There is conventional technology available for reproducing or recording information at high density by utilizing a laser beam. This conventional technology is commercialized mainly as optical disks.

Optical disks can be divided roughly into the read-only type, the write-once read-many type and the rewritable type.

The read-only type is commercialized as compact discs or laser disks, and the write-once read-many type and the rewritable type are commercialized as disks for recording document files and data files. As the rewritable type optical disk, a magneto optical disk and a phase-change type optical disk are mainly known.

The phase change type optical disk utilizes the reversible change of state of a recording layer between amorphous and crystalline states (or between a crystalline state and another crystalline state having a different structure) by irradiation with a laser beam. More specifically, when a laser beam is irradiated onto a phase-change type optical disk, at least one of a refractive index and an attenuation coefficient of a thin film for recording changes. In addition, when a laser beam is irradiated onto a recorded part of the phase-change type optical disk, the amplitude of light that passes through the recorded part, or light that is reflected by the recorded part, changes. As a result, the amount of the passed light or the reflected light that reaches the detection system changes so that the signal can be reproduced.

Generally in a phase-change type optical disk, the crystalline state of a recording layer material is used as the unrecorded state, while the amorphous state of the recording layer material is used as the recorded state. Here, the amorphous state is obtained by irradiating the laser beam so as to melt the recording layer material and by cooling the recording layer material rapidly. In addition, when erasing the signal, a laser beam of a smaller power than the power for recording is irradiated so that the recording layer becomes crystalline.

A chalcogen compound is often used as the recording layer material. The recording layer made of a chalcogen compound is deposited in the amorphous state, so it is necessary to crystallize the entire recording area in advance to give it the unrecorded state. This crystallization of the entire area is called "initialization".

The initialization process is included in a process for manufacturing the disk, and a laser beam or a flash light source is used to crystallize the recording layer. When using a laser beam, the disk is rotated while the laser beam is irradiated and focused onto an information layer. Then, the position of the optical head is shifted in the radial direction of the disk, so that the entire surface of the disk can be initialized.

Initialization conditions including a laser power, a linear speed, a defocus amount and a feed pitch in this initialization are determined so as to satisfy the following criterion. Namely, the initialization conditions are generally determined so that the entire initialization area is crystallized uniformly without remaining in the amorphous state, and so that the quality of signal is constant during the period from the first recording to after a plurality of times (a few tens of times) of overwriting information.

In order to determine the initialization conditions, the initialization conditions are detected at a middle position in the radial direction of the disk (a predetermined position within a data area for recording and reproducing information). Furthermore, the detected initialization conditions are used for initializing the entire surface of the disk, including a burst cutting area that will be described later. Namely, the same conditions are used for initializing the entire surface of the disk.

Note that a single-sided two-layer structure and a method for manufacturing the structure have been proposed for increasing the recording capacity per unit area of an optical disk, and a technique for changing the initialization conditions for each of the layers is known (for example, see Japanese unexamined patent publication No. 10-132982). In addition, there is a document that describes a method for manufacturing a phase-change optical disk that has the single-sided two-layer structure and is used with a blue violet laser beam (for example, see Japanese unexamined patent publication No. 2000-400442).

The standards for a DVD-RAM and a Blu-ray disk describe that a burst cutting area (hereinafter referred to as "BCA") is provided to a disk for identifying each disk.

This BCA is formed by cutting the film using a high power laser beam, or in a normal initialization process by providing initialized portions and uninitialized portions in the radial direction like a bar code (see FIG. 1), for example.

When forming the BCA in the initialization process, a relative angular velocity between the optical head of the laser beam for initialization and the disk is maintained at a constant value while the laser beam is turned on and off so that the initialized portions and the uninitialized portions are provided.

In addition, when reading information of the BCA, the disk is rotated, and the laser beam is focused onto a BCA region where the BCA is formed. Thus, the information of the BCA is read from the difference in reflectivity between a portion with the film and a portion without the film, or between the initialized portion and the uninitialized portion. Note that standards for a DVD-RAM and a Blu-ray disk describe that the BCA is provided to the innermost circumference on the rearmost layer viewed from the laser beam incident side.

The present inventors have been developing an optical disk having a phase-change type single-sided multi-layered structure using a blue-violet color laser beam. For example, they have been developing an optical disk including a transparent substrate on which a first information layer, an optical separation layer, a second information layer and a transparent layer are formed, as shown in FIG. 1. In addition, this optical disk has the BCA that is formed on the first information layer in the initialization process.

According to a study by the inventors, two problems are found in this initialization process as follows.

The first problem is that the second information layer may be initialized in part in the process for providing the BCA on the first information layer, when performing the initialization process on the first information layer and the second information layer one by one in this order.

The second problem is that a defocus may occur at the same radial area as the BCA region on the first information layer so that the initialization process is stopped during the initialization process of the second information layer after the initialization of the first information layer.

SUMMARY OF THE INVENTION

A main object of the present invention is provide a method for manufacturing an optical information recording medium having a single-sided multi-layered structure in which the above-mentioned problems are solved, and the optical information recording medium itself.

(i) A first method according to the present invention is a method for manufacturing an optical information recording medium that includes a disk-like substrate and an information layer formed on the substrate, the information layer including a BCA which comprises a plurality of band-like portions having different reflectivities, extending in the radial direction, and being arranged like a bar code. The BCA is formed by providing initialized portions and uninitialized portions in an area corresponding to the radius range of r1-r2 on the information layer. Furthermore, at least one of a laser power, a linear speed and a focal point of the laser beam for the information layer is changed between initializing an area of the radius range of r1-r2 and initializing an area of another radius range.

More specific description is as follows.

(1) The optical information recording medium includes a plurality of information layers and a transparent layer formed on a disk-like substrate in this order, and an optical separation layer is provided between the plurality of information layers. The information layer has at least a recording layer that generates an optically detectable reversible change between an amorphous phase and a crystalline phase by irradiation with the laser beam. At least one of the plurality of information layers has the BCA which comprises a plurality of band-like portions having different reflectivities, extending in the radial direction, and being arranged like a bar code.

(2) An initialization power for an information layer with the BCA is set to a lower value when initializing the area of the radius range of r1-r2 than when initializing the area of other radius range.

(3) An initialization linear speed for an information layer with the BCA is set to a higher value when initializing the area of the radius range of r1-r2 than when initializing the area of other radius range.

(4) A focal point of the initialization laser beam for an information layer with the BCA is set farther from the information layer to be initialized when initializing the area of the radius range of r1-r2 than when initializing the area of other radius range.

(ii) A second method according to the present invention is a method for manufacturing an optical information recording medium that includes a disk-like substrate and a plurality of information layers formed on the substrate, the plurality of information layers including a first information layer that includes a BCA which comprises a plurality of band-like portions having different reflectivities, extending in the radial direction, and being arranged like a bar code. The BCA is formed by providing initialized portions and uninitialized portions in an area corresponding to the radius range of r1-r2 on the first information layer. Furthermore, for an information layer without the BCA, at least one of a laser power, a linear speed, a focal point of the laser beam, and a feed pitch of the laser beam is changed between initializing the area of the radius range of r1-r2 and initializing the area of other radius range.

Here, the optical information recording medium may be as follows. Namely, the optical information recording medium includes a plurality of information layers and a transparent layer formed on a disk-like substrate in this order, and the optical information recording medium further includes an optical separation layer disposed between the plurality of information layers. Each of the information layers has at least a recording layer that generates an optically detectable reversible change between an amorphous phase and a crystalline phase by irradiation with an energy beam. At least one of the plurality of information layers (a first information layer) has the BCA which comprises a plurality of band-like portions having different reflectivities, extending in the radial direction, and being arranged like a bar code.

More specific description for the second method is as follows.

(1) An initialization laser beam power for an information layer without the BCA is set to a higher value when initializing the area of the radius range of r1-r2 than when initializing the area of other radius range.

(2) An initialization linear speed for an information layer without the BCA is set to a lower value when initializing the area of the radius range of r1-r2 than when initializing the area of other radius range.

(3) A focal point of the initialization laser beam for an information layer without the BCA is set closer to the information layer to be initialized when initializing the area of the radius range of r1-r2 than when initializing the area of other radius range.

(4) A feed pitch of the initialization laser beam for an information layer without the BCA is set to a smaller value when initializing the area of the radius range of r1-r2 than when initializing the area of other radius range.

Furthermore, the optical information recording medium itself in the first and the second method for manufacturing an optical information recording medium satisfies the inequalities Ra1>Ra2 and Rc1<Rc2. Here, Ra1 and Rc1 respectively denote the reflectivities in the amorphous state and in the crystalline state of an information layer with the BCA (hereinafter referred to as "first information layer") at a wavelength of the laser beam for crystallization. Ra2 and Rc2 respectively denote reflectivities in the amorphous state and in the crystalline state of an information layer without the BCA (hereinafter referred to as "first information layer") at a wavelength of the laser beam for crystallization.

In addition, the first information layer and the second information layer are initialized by using one optical head in the order of the first information layer and then the second information layer.

(iii) A first structure of the optical information recording medium according to the present invention includes a disk-like substrate and an information layer formed on the substrate, the information layer including a BCA which comprises a plurality of band-like portions having different reflectivities, extending in the radial direction, and being arranged like a bar code. The BCA is formed by providing initialized portions and uninitialized portions in the area corresponding to the radius range of r1-r2 (hereinafter referred to as "BCA region") on the information layer. Furthermore, reflectivities are different between radial positions r3 and r4 on the information layer with the BCA, where r3 denotes a radial position of an initialized portion in the BCA region and a position being close to a data area, and r4 denotes a radial position of an initialized portion in the data area and a position being close to the BCA region.

More specific description is as follows.

(1) The optical information recording medium includes a plurality of information layers and a transparent layer formed on a disk-like substrate in this order and the optical information recording medium further includes an optical separation layer disposed between the plurality of information layers. The information layer has at least a recording layer that generates an optically detectable reversible change between an amorphous phase and a crystalline phase by irradiation with an energy beam. At least one of the plurality of information layers has the BCA which comprises a plurality of band-like portions having different reflectivities, extending in the radial direction, and being arranged like a bar code.

(2) An information layer with the BCA of the optical information recording medium has a reflectivity at a radius r3 lower than a reflectivity at a radius r4.

(3) The optical information recording medium is manufactured by the initialization process in which at least one of the initialization conditions for an information layer with the BCA is changed between initializing the area of a radius range r1-r2 and initializing the area of other radius range. Here, the initialization conditions include a laser power, a linear speed, and a focal point of the laser beam for the information layer with the BCA.

(4) The optical information recording medium is manufactured by the initialization process in which a laser power for an information layer with the BCA is set to a lower value when initializing the area of a radius range r1-r2 than when initializing the area of other radius range.

(5) The optical information recording medium is manufactured by the initialization process in which an initialization linear speed for an information layer with the BCA is set to a higher value when initializing the area of a radius range of r1-r2 than when initializing the area of other radius range.

(6) The optical information recording medium is manufactured by the initialization process in which a focal point of the initialization laser beam for an information layer with the BCA is set farther from the information layer to be initialized when initializing the area of a radius range of r1-r2 than when initializing the area of other radius range.

(iv) A second structure of the optical information recording medium according to the present invention includes a disk-like substrate and a plurality of information layers formed on the substrate, the plurality of information layers including a first information layer that includes a BCA which comprises a plurality of band-like portions having different reflectivities, extending in the radial direction, and being arranged like a bar code. The BCA is formed by providing initialized portions and uninitialized portions in an area corresponding to the radius range of r1-r2 (hereinafter referred to as "BCA region") on the first information layer. Furthermore, reflectivities are different between radial positions r3 and r4 on the information layer without the BCA, where r3 denotes a radial position of an initialized portion in the BCA region and a position being close to a data area, and r4 denotes a radial position of an initialized portion in the data area and a position being close to the BCA region.

Here, the optical information recording medium may be as follows. Namely, the optical information recording medium includes a plurality of information layers and a transparent layer formed on a disk-like substrate in this order, and the optical information recording medium further includes an optical separation layer disposed between the plurality of information layers. Each of the information layers has at least a recording layer that generates an optically detectable reversible change between an amorphous phase and a crystalline phase by irradiation with an energy beam. At least one of the plurality of information layers (a first information layer) has the BCA which comprises a plurality of band-like portions having different reflectivities, extending in the radial direction, and being arranged like a bar code.

More specific description is as follows.

(1) An information layer without the BCA of the optical information recording medium has a reflectivity at a radius r3 higher than a reflectivity at a radius r4.

(2) The optical information recording medium is manufactured by the initialization process in which at least one of the initialization conditions for an information layer without the BCA is changed between initializing the area of a radius range r1-r2 and initializing the area of other radius range. Here, the initialization conditions include a laser power, a linear speed, and a focal point of the laser beam for the information layer without the BCA.

(3) The optical information recording medium is manufactured by the initialization process in which a laser power for an information layer without the BCA is set to a higher value when initializing the area of a radius range r1-r2 than when initializing the area of other radius range.

(4) The optical information recording medium is manufactured by the initialization process in which an initialization linear speed for an information layer without the BCA is set to a lower value when initializing the area of a radius range of r1-r2 than when initializing the area of other radius range.

(5) The optical information recording medium is manufactured by the initialization process in which a focal point of the initialization laser beam for an information layer without the BCA is set closer to the information layer to be initialized when initializing the area of a radius range of r1-r2 than when initializing the area of other radius range.

(6) The optical information recording medium is manufactured by the initialization process in which a feed pitch for an information layer without the BCA is set to a smaller value when initializing the area of a radius range of r1-r2 than when initializing the area of other radius range.

Furthermore, the first or the second optical information recording medium preferably has a difference in reflectivities between radial positions r3 and r4 on an information layer with the BCA or an information layer without the BCA, and the difference is 0.2% or more.

In addition, a difference in the distances between radial positions r3 and r4 is 0.2 mm or less.

According to the present invention, the initialization of an optical information recording medium can be performed appropriately. Stopping of the initialization process on a track is prevented so that yield of manufacturing optical information recording media can be improved.

DESCRIPTION OF THE PREFERRED EMBODIMENTS (General Outlines of the Invention)
(A Principle of an Initialization Process)

First, a principle of an initialization process for a first information layer and a second information layer will be described in detail with reference to FIG. 2.

Figure 1:
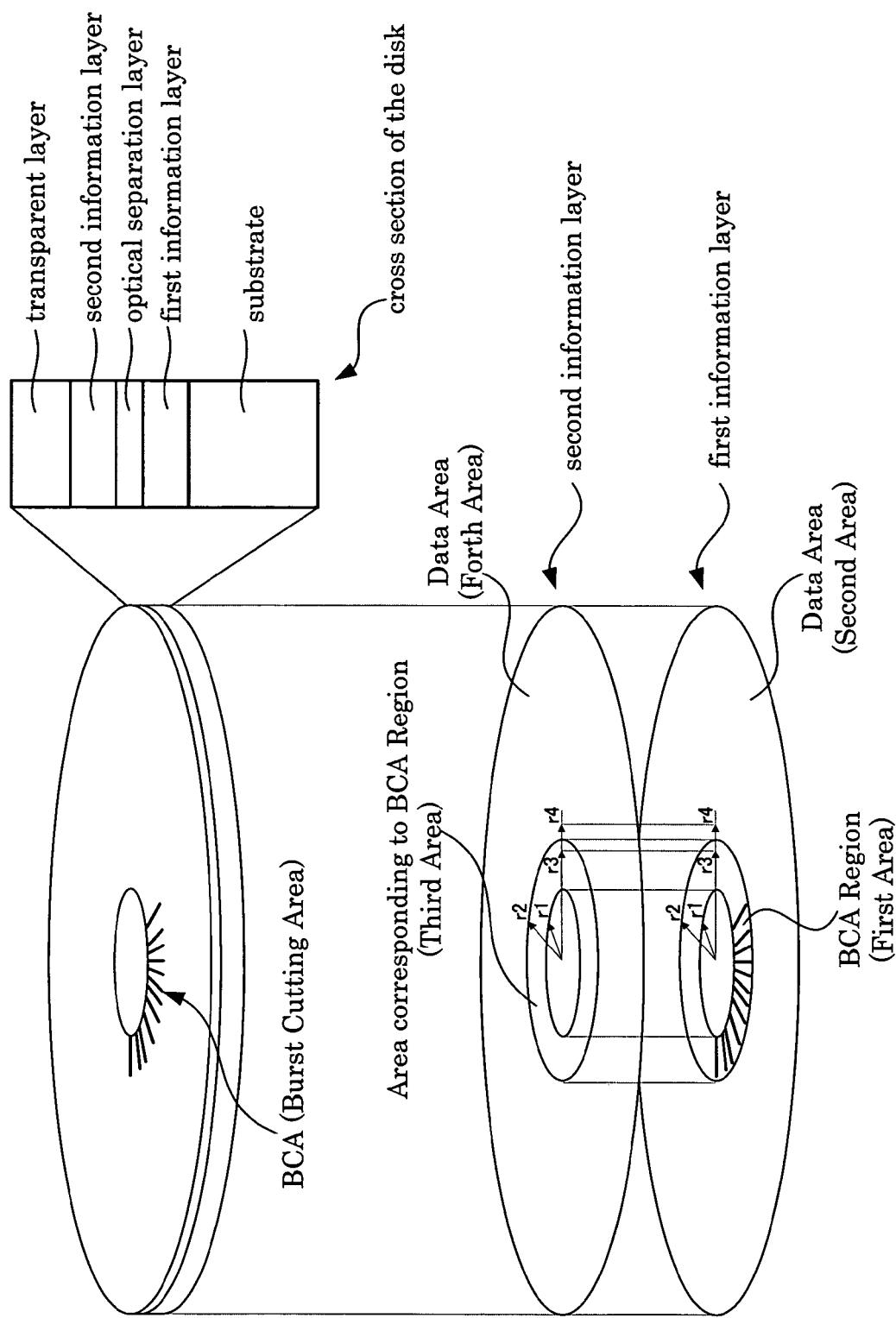
FIG. 1 shows a structure of an optical disk used for an embodiment of the present invention.
Figure 2:
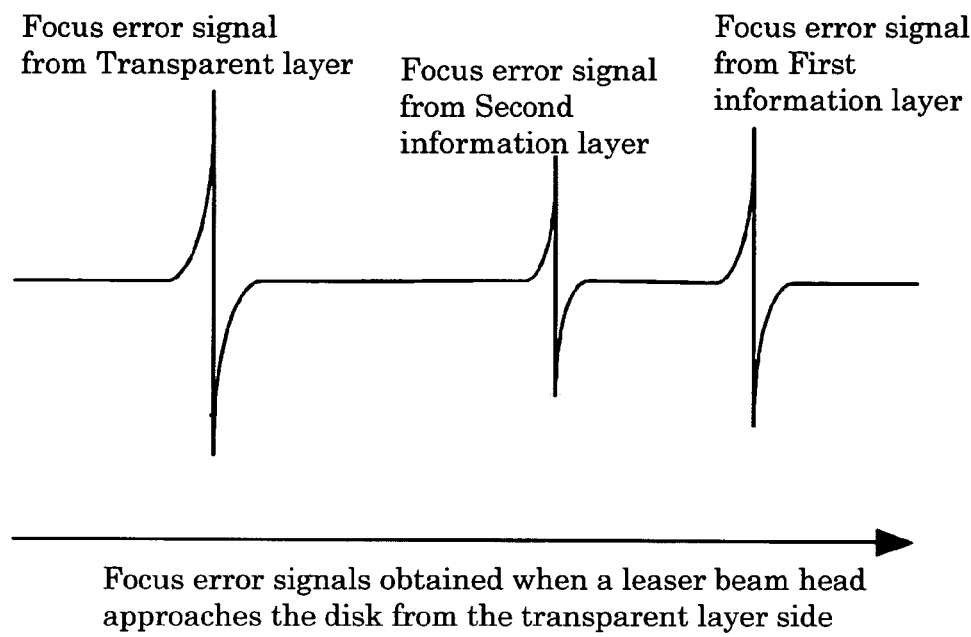
FIG. 2 shows a focus error signal for initialization of the optical disk used for an embodiment of the present invention.

When the optical head for irradiating an initialization laser beam approaches a transparent layer as shown in FIG. 2, three focus error signals (that are respectively from the transparent layer, the second information layer, and the first information layer (see FIG. 1)) are detected sequentially. Amplitudes of the three focus error signals are detected to be large when the reflectivity of each information layer is high, and detected to be small when it is low.

The reflectivity of each information layer varies depending on a combination of the structure of the thin film and the phase state thereof (amorphous or crystalline). If the detected focus error signal is small, the probability of failure in the initialization process increases.

The structure of the information layer used here satisfies the inequalities Ra1>Ra2 and Rc1<Rc2 at a wavelength of the laser beam for crystallizing the first information layer and the second information layer. Here, Ra1 and Rc1 respectively denote reflectivities in the amorphous state and in the crystalline state of the first information layer, while Ra2 and Rc2 respectively denote reflectivities in the amorphous state and in the crystalline state of the second information layer. If the first information layer and the second information layer are in the uninitialized state, when the initialization laser beam is irradiated, the initialization laser beam can be focused onto the first information layer because of Ra1>Ra2, and the first information layer can be initialized. Next, in order to initialize the second information layer, an initialized portion (a crystallized portion), even if small, is made on the second information layer. Then Rc1<Rc2 is satisfied, and the laser beam can be focused onto the second information layer. Thus, the second information layer can be initialized.

(Reasons Why the Problems Occur)

According to a study by the present inventors, the above-mentioned problems are considered to occur due to the following reasons.

First, the reason why the second information layer is initialized partially during initialization of the first information layer, which is the first problem, is considered as below.

When the first information layer is initialized, the initialization laser beam is also irradiated onto the second information layer in an unfocused state. For the disk that the inventors are developing, an initialization laser power that is necessary for initializing the second information layer must be higher than a laser power that is necessary for initializing the first information layer. Therefore, during initialization of the first information layer, the second information layer is not to be initialized.

However, the energy amount that is necessary for being crystallized (initialized) varies depending on the disk structure. The disk that is adopted here has a disk structure in which initialization sensitivity of the first information layer is lower than usual and initialization sensitivity of the second information layer is higher than usual. In addition, a multi-layered film that constitutes each information layer has variable film thickness in the radial direction of each disk. This film thickness variation causes a variation of the initialization sensitivity in the direction of the disk, too. The second information layer of the disk that is adopted here is considered to have a much higher initialization sensitivity at the innermost circumference of the disk where the BCA is formed due to the film thickness variation.

Therefore, if the same initialization method as the conventional one is used, the second information layer is partially initialized during initialization of the first information layer.

Next, the reason why a defocus occurs on the same radial area of the second information layer as the BCA region of the first information layer during initialization of the second information layer causing the initialization to be stopped, which is the second problem, is considered as below.

The disk that is adopted here has a structure in which the difference between Ra1 and Rc2 is smaller than usual at the same radial area as the BCA region having the uninitialized portion due to the film thickness variation in the radial direction. Therefore, when the laser beam that is initializing the second information layer approaches the same radial area as the BCA region, focusing becomes unstable.

Therefore, if the same initialization method as the conventional one is used, defocus occurs in the same radial area as the BCA region during initialization of the second information layer resulting in the initialization stopping.

First Embodiment

Hereinafter, an embodiment of the present invention will be described with reference to the drawings.

The technology that is described in this embodiment is for solving the above-mentioned first problem, i.e., for preventing the second information layer from being initialized partially during the time when the first information layer is initialized.

(Disk Structure)

Figure 3:
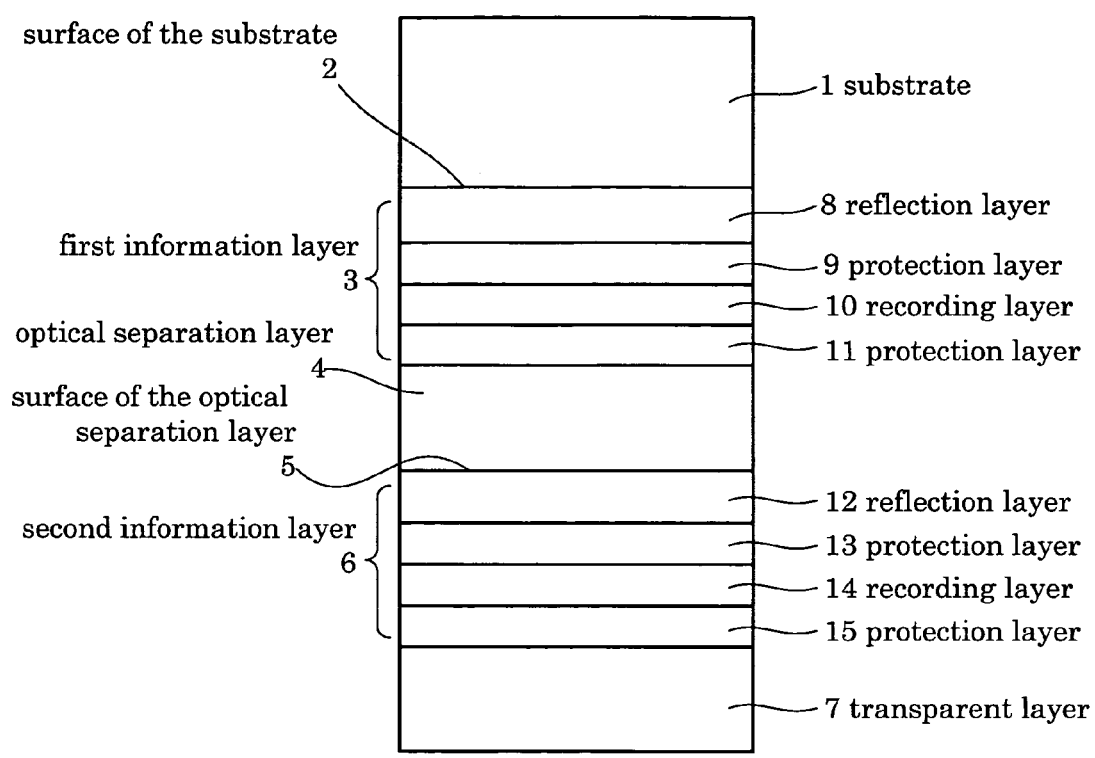
FIG. 3 shows a structure of the optical disk used for the embodiment of the present invention.

A structure of the disk used in this embodiment will be described with reference to FIG. 3. In FIG. 3, the laser beam for recording or reproducing information or initializing the information layer enters from the side of a transparent layer 7. A substrate 1 is made of a resin plate such as polycarbonate or PMMA or a glass plate. A surface of a substrate 2 is covered with a spiral groove or concentric grooves.

A first information layer 3 is formed on the substrate 1 (at the laser beam incident side). The first information layer 3 includes at least a reflection layer 8, protection layers 9 and 11, and a recording layer 10.

An optical separation layer 4 is formed on the first information layer 3. The optical separation layer 4 is made of a material which is transparent for a wavelength of the laser beam irradiated for recording and reproducing a signal on the first information layer 3. The optical separation layer 4 has the function of optically separating the first information layer from the second information layer. The optical separation layer 4 is formed by a spin coat method for forming a layer made of an ultraviolet curing resin or the like, or by a method for bonding a transparent film by using an adhesive tape or an ultraviolet curing resin. A surface 5 of optical separation layer is covered with a spiral groove or concentric grooves.

A second information layer 6 is formed on the optical separation layer 4. The second information layer 6 includes at least a reflection layer 12, protection layers 13 and 15, and a recording layer 14.

The transparent layer 7 is formed on the second information layer 6. The transparent layer 7 is formed by a spin coat method for forming a layer made of an ultraviolet curing resin or the like, or by a method for bonding a transparent film onto the information layer 6 by using an adhesive tape or an ultraviolet curing resin.

The protection layers 9, 11,13 and 15 can be made of a material containing an oxide of Al, Si, Ta, Mo, W, Zr or the like, a sulfide of ZnS or the like, a nitride of Al, B, Ge, Si, Ti, Zr or the like, or a fluoride of Pb, Mg, La or the like as a principal component. In this embodiment, a material having a composition of ZnS-20 mol % SiO2 is used.

The recording layers 10 and 14 can be made of a material that is a phase change material containing Te, In, Se or the like as a principal component. As a principal component of a well-known phase change material, there are TeGeSb, TeGeSn, TeGeSnAu, SbSe, SbTe, SbSeTe, In—Te, In—Se, In—Se—Tl, InSbInSbSe, GeSbTeAg and the like. Material systems that are commercialized or often researched at present for a phase change optical disk include the GeSbTe system, the AgGeSbTe system or the like. The recording layer is usually formed in the amorphous state. When these recording layer materials are used, transmittance in the crystalline state is smaller than transmittance in the amorphous state at an infrared wavelength that is usually used for initialization of a recording layer. In this embodiment, a recording layer material of the GeSbTe system is mainly used.

The reflection layers 8 and 12 can be made of a material containing a metal element such as Ag, Au, Al or the like as a principal component. In addition, instead of a metal reflection layer, two or more types of protection layers having different refractive index values may be laminated so as to obtain optical characteristics similar to that of the reflection layer. In this embodiment, a metal reflection layer containing Ag as a principal component is used.

Each of the protection layer, the recording layer, and the reflection layer is usually formed by an electron beam evaporation method, a sputtering method, a CVD method, a laser sputtering method or the like. In this embodiment, the sputtering method is used.

(Initialization Process)

Next, a process for initializing the optical information recording medium having the above-mentioned single-sided two-layer structure by using a laser beam will be described.

An outline of the initialization device will be described with reference to FIG. 4. The laser beam emitted by a laser beam source is focused by an objective lens on the second information layer 6 or the first information layer 3 by an astigmatic aberration method, for example. The focusing is performed by using focus error signals obtained from the first information layer 3 and the second information layer 6. A focusing control is performed by a knife edge method or other various methods.

Next, a procedure for focusing the initialization laser beam on a desired information layer will be described, in which the first information layer 3 and the second information layer 6 are distinguished from each other when initializing the formed information layers (the first information layer 3 and the second information layer 6).

First, when the optical head that irradiates the laser beam for the initialization approaches the transparent layer, three focus error signals from the transparent layer 7, the second information layer 6 and the first information layer 3 are detected sequentially (see FIG. 2). For example, in order to initialize the second information layer 6, the focusing is performed by the second focus error signal among the focus error signals when the optical head approaches the transparent layer. Alternatively, the initialization device performs the process of detecting the focus error signal from the first information layer 3, and then focusing is performed by the second focus error signal while moving the optical head away from the transparent layer (Note that the same method is used for the focus also in the case of more than two information layers).

There are a plurality of ways of initializing the first and the second information layers 3 and 6, as follows.

(1) The initialization of each of the information layers is performed just after forming each of the information layers.

(2) The initialization is performed just after forming each of the information layers and the optical separation layer 4 thereon (the transparent layer 7 on the second information layer 6).

(3) The initialization is performed after forming the first information layer 3, the optical separation layer 4, the second information layer 6, and the transparent layer 7 on the substrate 1 (Note that the transparent layer 7 may be formed after the initialization).

(4) In the case of (3), the first information layer 3 is initialized prior to the initialization of the second information layer 6 (Note that the opposite order is possible).

In addition, a high laser power is necessary for crystallization (initialization) by using a laser beam, so an infrared laser having a wavelength of approximately 800 nm is usually used.

In this embodiment, the BCA is provided by utilizing the initialization process. The initialization area to be initialized is an area of the radius range of 21-59 mm on the disk, and the BCA is formed in the area corresponding to the radius range of 21-22 mm on the disk by providing band-like uninitialized portions (uninitialized portions) which extend in the radial direction and are arranged like a bar code. In addition, when forming the BCA (within the radius range of 21-22 mm), the disk is rotated at a constant angular speed (2728 rpm) for performing the initialization. The angular speed corresponds to a linear speed of 6.0 m/sec at a radius 21 mm and 6.28 m/sec at a radius 22 mm.

The structure of the disk used in this embodiment will now be described in more detail.

As an example of a structure of the disk, a polycarbonate plate is adopted as the substrate 1, which has a diameter of 120 mm and a thickness of 1.1 mm, and a surface of which is covered with a guide groove having a depth of 20 nm and a track pitch of 0.3 μm. On the substrate 1, an Ag reflection layer, GeN, ZnS-20 mol % SiO2, Ge22Sb25Te53 (at %) and ZnS-20 mol % SiO2 are formed in this order by a magnetron sputtering method so as to form the first information layer 3. Then, a polycarbonate plate having a diameter of 120 mm, a thickness of 25 μm and a surface covered with a guide groove having a depth of 20 nm and a track pitch of 0.3 μm is formed by an ultraviolet curing resin so as to form the optical separation layer 4 having a total thickness of 30 μm on the first information layer 3. After that, on the optical separation layer 4, an Ag reflection layer, GeN, Ge22Sb25Te53 (at %) and ZnS-20 mol % SiO2 are formed in this order by a magnetron sputtering method so as to form the second information layer 6. Then, the transparent layer 7 having a thickness of 0.1 mm is formed by a spin coat method.

The structure of the disk used for the study, especially the structure of the information layer, is as follows.

The first information layer 3 has a structure in which an Ag reflection layer of 100 nm, a GeN layer of 5 nm, a ZnS-20 mol % SiO2 layer of 25 nm, a GeSbTe recording layer of 15 nm and a ZnS-20 mol % SiO2 layer of 60 nm are formed on the substrate 1.

The second information layer 6 has a structure in which the optical separation layer 4 is formed on the first information layer 3, and then an Ag reflection layer of 10 nm, a GeN layer of 5 nm, a ZnS-20 mol % SiO2 layer of 24 nm, a GeSbTe recording layer of 6 nm and a ZnS—SiO2 layer of 50 nm are formed. Furthermore, the transparent layer 7 is formed on the second information layer 6.

Figure 4:
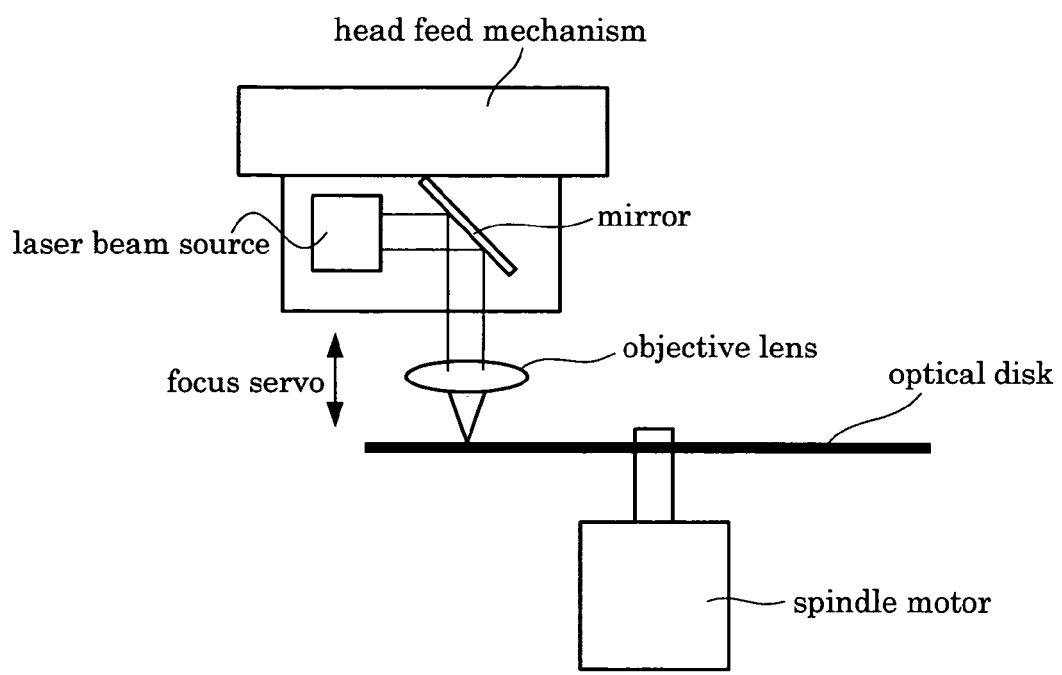
FIG. 4 shows a structure of an initialization device for the optical disk used for the embodiment of the present invention.

The initialization of each information layer is performed by using the initialization device having the laser beam source of a wavelength 810 nm as shown in FIG. 4. The initialization condition is determined in advance to be a condition without deterioration of the signal quality (a condition without a increase of jitter) at a radius of 40 mm on the disk when overwriting information.

On the first information layer 3, the determined initialization condition (a second initialization condition) includes the defocus amount of the laser beam at +3 μm (a plus sign means the state where a correct focus position is located at the back side of the first information layer 3 viewed from the laser incident side, while a minus sign means the state where the correct focus position is located at the front side), a linear speed of 6 m/sec, a feed pitch of 40 μm, a laser power of 1650-1750 mW (in this embodiment, the laser power is set to 1700 mW).

On the second information layer 6, the determined initialization condition (a fourth initialization condition) includes a defocus amount of +3 μm, the linear speed of 3 m/sec, the feed pitch of 40 μm and the laser power of 870-930 mW (in this embodiment, the laser power is set to 900 mW).

Note that the laser beam having a width of 100 μm in the radial direction of the disk is used for the initialization.

The initialization of each of the information layers is performed after forming the first information layer 3, the optical separation layer 4, the second information layer 6 and the transparent layer 7.

When initializing the first information layer 3, the initialization laser power, the linear speed and the defocus amount are changed between the BCA region (a first area, see FIG. 1) where the BCA is formed and another initialization area (a second area, see FIG. 1), so as to study the stability of the initialization. The result of the study is as follows.

In this embodiment, when initializing the BCA region (corresponding to the radius range of 21-22 mm) and the data area (corresponding to the radius range of 22-59 mm) on the first information layer 3, the initialization condition is changed (i.e., the first initialization condition and the second initialization condition are respectively used). When the initialization of the first information layer 3 is finished, initialized states are checked by observation using an optical microscope. On this occasion, it is checked whether or not the second information layer 6 is initialized in error.

Table 1 shows the result in which the initialization laser power is changed while the linear speed is maintained at 6 m/sec and the defocus amount is maintained at +3 μm. Table 2 shows the result in which the linear speed is changed while the initialization laser power is maintained at 1700 mW and the defocus amount is maintained at +3 μm. Table 3 shows the result in which the defocus amount is changed while the initialization laser power is maintained at 1700 mW and the linear speed is maintained at 6 m/sec.

Furthermore, each of Tables 1-3 show the reflectivities at the radial position r3=21.9 mm and the radial position r4=22.1 mm on the first information layer 3 when using each initialization condition (see FIG. 1). More specifically, the radial position r3 is located in the BCA region (the first area) and is close to the data area (the second area). In addition, the radial position r4 is located in the data area (the second area) and is close to the BCA region (the first area) on the first information layer 3. Furthermore, there are shown the reflectivities from the radial position r3 and the radial position r4 at the wavelength of 405 nm in a mirror portion of the reflected light.

TABLE 1

| Initialization power for BCA region on first information layer | Observation result by optical microscope | Decision | Reflectivity at radius r3 | Reflectivity at radius r4 |
| --- | --- | --- | --- | --- |
| 1450 mW | Uneven initialization in BCA | N.G. | 5.5% | 6.1% |
| 1500 mW | Second information layer is not initialized | O.K. | 5.6% | 6.1% |
| 1550 mW | Second information layer is not initialized | O.K. | 5.8% | 6.1% |
| 1600 mW | Second information layer is not initialized | O.K. | 5.9% | 6.1% |
| 1650 mW | Second information layer is initialized | N.G. | 6.0% | 6.1% |
| 1750 mW | Second information layer is initialized | N.G. | 6.1% | 6.1% |
| 1850 mW | Second information layer is initialized | N.G. | 6.4% | 6.1% |

TABLE 2

| Initialization line speed for BCA region on first information layer | Observation result by optical microscope | Decision | Reflectivity at radius r3 | Reflectivity at radius r4 |
| --- | --- | --- | --- | --- |
| 7.5 m/sec | Uneven initialization in BCA | N.G. | 5.5% | 6.1% |
| 7.0 m/sec | Second information layer is not initialized | O.K. | 5.7% | 6.1% |
| 6.5 m/sec | Second information layer is not initialized | O.K. | 5.9% | 6.1% |
| 6.0 m/sec | Second information layer is initialized | N.G. | 6.1% | 6.1% |
| 5.5 m/sec | Second information layer is initialized | N.G. | 6.3% | 6.1% |

TABLE 3

| Defocus amount for BCA region on first information layer | Observation result by optical microscope | Decision | Reflectivity at radius r3 | Reflectivity at radius r4 |
|---|---|---|---|---|
| +4.0 μm | Second information layer is not initialized | O.K. | 5.6% | 6.1% |
| +3.5 μm | Second information layer is not initialized | O.K. | 5.9% | 6.1% |
| +3.0 μm | Second information layer is initialized | N.G. | 6.1% | 6.1% |
| +2.5 μm | Second information layer is initialized | N.G. | 6.3% | 6.1% |
| +2.0 μm | Second information layer is initialized | N.G. | 6.5% | 6.1% |

The following fact is confirmed from Table 1.

When the initialization laser power for the BCA region is set to a value more than or equal to 1650-1750 mW which is the optimal power for the data area, a part of the second information layer 6 is initialized in error. When initialization laser power for the BCA region is set to a value less than 1650 mW which is an optimal power for the data area (namely, the laser power density in a unit area is small), the second information layer 6 is not initialized. The BCA is used only for reading a signal as a difference in reflectivities between the initialized portion and the uninitialized portion, so it is sufficient if the BCA is crystallized uniformly. Thus, for example, the BCA may be formed with 1550 mW power, because there is no large influence to the reflectivity. However, if the initialization laser power is reduced to 1450 mW for example, uneven initialization of the BCA may occur. Therefore, it is preferable to perform the initialization by an initialization laser power within the range of more than 1450 mW and less than 1650 mW, more preferably within the range of no less than 1500 mW and no more than 1600 mW.

In addition, a good result is obtained when the initialization laser power for the BCA region is set to a value 5.9-11.8% lower than the initialization laser power for the data area (when the laser power is reduced). Note that this value range is merely determined corresponding to the structure of the disk that is used in this embodiment and the structure of the initialization device, and does not limit an effective range of the present invention. For example, the optimal range can be changed depending on a structure of the disk or a structure of the initialization device.

The following fact is confirmed from Table 2.

When the initialization linear speed for the BCA region is set to a value lower than 6 m/sec which is the linear speed for the data area, a part of the second information layer 6 is initialized in error. On the other hand, when the initialization linear speed is set to a value higher than 6.5 m/sec (namely, when the laser power density in a unit area is small), the second information layer 6 is not initialized. However, if the initialization linear speed is increased to 7.5 m/sec for example, uneven initialization of the BCA may occur. Therefore, it is preferable to perform the initialization by an initialization linear speed within the range of more than 6.0 m/sec and less than 7.5 m/sec, more preferably within the range of no less than 6.5 m/sec and no more than 7.0 m/sec.

In addition, a good result is obtained when the initialization linear speed for the BCA region is set to a value 8.3-16.7% higher than the initialization linear speed for the data area (when the linear speed is increased). Note that this value range is merely determined corresponding to the structure of the disk that is used in this embodiment and the structure of the initialization device, and does not limit the effective range of the present invention. For example, the optimal range can be changed depending on the structure of the disk or the structure of the initialization device.

The following fact is confirmed from Table 3.

When the defocus amount for initializing the BCA region is set to a value which is closer to 0 μm (the "just focus" amount) than +3 μm which is the defocus amount for the data area, a part of the second information layer 6 is initialized in error. However, if the defocus amount is increased, the second information layer 6 is not initialized. Therefore, it is preferable to perform the initialization with a defocus amount larger than +3 μm, more preferably +3.5 μm or more.

In addition, a good result is obtained when the defocus amount for the BCA region is set to a value 16.7% or more larger than the defocus amount for the data area (when the defocus amount is increased). Note that this value range is merely determined corresponding to the structure of the disk that is used in this embodiment and the structure of the initialization device, and does not limit the effective range of the present invention. For example, the optimal range can be changed depending on the structure of the disk or the structure of the initialization device.

As described above, the second information layer 6 is not initialized in error when different initialization conditions are used for the BCA region and the data area. More specifically, the second information layer 6 is not initialized in error when the initialization condition, in which a laser power, a linear speed and a defocus amount are adjusted so that the laser power density in a unit area is lower than that of the initialization condition for the data area, is used for the BCA region.

In addition, as understood from Tables 1-3, the second information layer 6 is not initialized when the difference in reflectivities of the initialized portion between a radius of 21.9 mm (a radial position in the BCA region) and a radius of 22.1 mm (a radial position in the data area) is 0.2% or more and when the reflectivity at the radius 21.9 mm is lower than the other. Note that though the difference in the reflectivities is also generated when the laser power density in a unit area is too low, this causes an initialization process error because the initialization is not performed uniformly.

Here, it is considered that a distance in radial directions at about 0.2 mm does not cause a difference in reflectivities due to the film thickness distribution on each layer. Therefore, the difference in the disk reflectivities shown in Tables 1-3 is considered to be caused by a difference in the initialization conditions. For example, if the laser power density in a unit area is high, the degree of initialization increases so that the reflectivity becomes high. However, if the laser power density exceeds a certain value, the reflectivity becomes saturated. Therefore, if there is a difference in reflectivities more than 0.2% within the radius 0.2 mm, the above-mentioned difference in reflectivities can be attributed to the difference in initialization conditions.

Note that each of the parameters including a laser power, a linear speed and a defocus amount is changed individually so that the laser power density in a unit area is changed in this embodiment. A similar result can be obtained if some of these parameters are changed concurrently so as to change the laser power density.

Note that the initialization is performed from the inner circumference to the outer circumference in this embodiment. A similar result can be obtained if the initialization is performed from the outer circumference to the inner circumference.

Second Embodiment

The technology that is described in this embodiment is for solving the above-mentioned second problem, i.e., for preventing the stopping of the initialization of the second information layer after a defocus occurs during the initialization.

When initializing the second information layer 6, the initialization power, the linear speed and the defocus amount are changed between an area (a third area, see FIG. 1) having the same radius as the BCA region (the first area, see FIG. 1) on the first information layer 3 and an area (a fourth area, see FIG. 1) having the same radius as the data area (the second area, see FIG. 1) on the first information layer 3, so as to study the stability of the initialization. The result of the study is as follows. The disk structure and the initialization device in this embodiment are the same as in the first embodiment, so a detailed description thereof is omitted.

On the first information layer 3, the BCA is formed in the BCA region corresponding to the radius range of 21-22 mm by the initialization process in advance, and further, the initialization is performed in the data area corresponding to the radius range of 22-59 mm.

In this embodiment, consecutively, the area corresponding to the radius range of 21-59 mm on the second information layer 6 is initialized. On this occasion, the area corresponding to the radius range of radius 21-22 mm, which is the same radius as the BCA region on the first information layer 3, is initialized by an initialization condition (a third initialization condition) which is a variation of an appropriate initialization condition (a fourth initialization condition) that is determined in advance for the area corresponding to the radius range of 22-59 mm, while the area corresponding to the radius range of 22-59 mm is initialized by the appropriate initialization condition that is determined in advance. It is checked whether or not the initialization process of the second information layer 6 is completed without stopping.

As described in the first embodiment, the appropriate initialization condition determined for the data area on the second information layer 6 includes the defocus amount of +3 μm, the linear speed of 3 m/sec, the feed pitch of 40 μm and the laser power of 870-930 mW (900 mW is used in this embodiment).

In the initialization of the area corresponding to the radius range of 21-22 mm on the second information layer 6, the linear speed and the defocus amount are kept at constant values of 3 m/sec and +3 m respectively, while the initialization laser power is changed. The result is shown in Table 4. Table 5 shows the result when the initialization laser power and the defocus amount are kept at constant values of 900 mW and +3 μm respectively, while the linear speed is changed. Table 6 shows the result when the initialization laser power and the linear speed are kept at constant values of 900 mW and 3 m/sec respectively, while the defocus amount is changed.

Furthermore, each of the Tables show the reflectivities at the radial position r3=21.9 mm and the radial position r4=22.1 mm on the second information layer 6 when using each initialization condition (see FIG. 1). More specifically, the radial position r3 is located on the second information layer 6 in the area (the third area) corresponding to the BCA region (the first area) and is close to the data area (the fourth area). In addition, the radial position r4 is located on the second information layer 6 in the data area (the fourth area) and is close to the area (the third area) corresponding to the BCA region (the first area). Furthermore, there is shown the reflectivities from the radial position r3 and the radial position r4 at the wavelength of 405 nm in the mirror portion of the reflected light.

TABLE 4

| Initialization power for radius 21-22 mm on second information layer | Initialization state | Decision | Reflectivity at radius r3 | Reflectivity at radius r4 |
| --- | --- | --- | --- | --- |
| 870 mW | Initialization stops at radius 21-22 mm | N.G. | 5.4% | 5.5% |
| 900 mW | Initialization stops at radius 21-22 mm | N.G. | 5.5% | 5.5% |
| 930 mW | Initialization stops at radius 21-22 mm | N.G. | 5.6% | 5.5% |
| 960 mW | Initialization does not stop | O.K | 5.7% | 5.5% |
| 990 mW | Initialization does not stop | O.K | 5.9% | 5.5% |

TABLE 5

| Initialization line speed for radius 21-22 mm on second information layer | Initialization state | Decision | Reflectivity at radius r3 | Reflectivity at radius r4 |
| --- | --- | --- | --- | --- |
| 2.4 m/sec | Initialization does not stop | O.K. | 5.8% | 5.5% |

TABLE 5-continued

| Initialization line speed for radius 21-22 mm on second information layer | Initialization state | Decision | Reflectivity at radius r3 | Reflectivity at radius r4 |
|---|---|---|---|---|
| 2.7 m/sec | Initialization does not stop | O.K. | 5.7% | 5.5% |
| 3.0 m/sec | Initialization stops at radius 21-22 mm | N.G. | 5.5% | 5.5% |
| 3.3 m/sec | Initialization stops at radius 21-22 mm | N.G. | 5.3% | 5.5% |
| 3.6 m/sec | Initialization stops at radius 21-22 mm | N.G. | 5.1% | 5.5% |

TABLE 6

| Defocus amount for radius 21-22 mm on second information layer | Optical microscope observation result | Decision | Reflectivity at radius r3 | Reflectivity at radius r4 |
|---|---|---|---|---|
| +4.0 μm | Initialization stops at radius 21-22 mm | N.G. | 5.1% | 5.5% |
| +3.5 μm | Initialization stops at radius 21-22 mm | N.G. | 5.3% | 5.5% |
| +3.0 μm | Initialization stops at radius 21-22 mm | N.G. | 5.5% | 5.5% |
| +2.5 μm | Initialization does not stop | O.K. | 5.7% | 5.5% |
| +2.0 μm | Initialization does not stop | O.K. | 5.9% | 5.5% |

The following fact is confirmed from Table 4.

When the area corresponding to the radius range of 21-22 mm on the second information layer 6 is initialized by a laser power lower than or equal to 870-930 mW, which is an appropriate laser power for the data area, the initialization process stops after a defocus occurs in the area of radius 21-22 mm. When the laser power is increased above the appropriate laser power, the initialization does not stop due to the defocus during the process. Thus, initialization yield is improved. For example, it is preferable to perform the initialization process by a laser power more than 930 mW, more preferably more than or equal to 960 mW.

In addition, a good result is obtained when the initialization laser power for the area corresponding to the BCA region is set to a value 6.7% or more higher than the initialization laser power for the data area (when the laser power is increased). Note that this value range is merely determined corresponding to the structure of the disk that is used in this embodiment and the structure of the initialization device, and does not limit the effective range of the present invention. For example, the optimal range can be changed depending on the structure of the disk or the structure of the initialization device.

The following fact is confirmed from Table 5.

When the area corresponding to the radius range of 21-22 mm on the second information layer 6 is initialized by a linear speed more than or equal to 3.0 m/sec, which is an appropriate linear speed for the data area, the initialization process stops after a defocus occurs in the area of radius 21-22 mm. When the linear speed is decreased below the appropriate linear speed, the initialization does not stop due to the defocus during the process, so the initialization yield is improved. For example, it is preferable to perform the initialization process by a linear speed lower than 3.0 m/sec, more preferably lower than or equal to 2.7 m/sec.

In addition, a good result is obtained when the linear speed for the area corresponding to the BCA region is set to a value of −10% or more lower than the linear speed for the data area (when the linear speed is decreased). Note that this value range is merely determined corresponding to the structure of the disk that is used in this embodiment and the structure of the initialization device, and does not limit the effective range of the present invention. For example, the optimal range can be changed depending on the structure of the disk or the structure of the initialization device.

The following fact is confirmed from Table 6.

When the area corresponding to the radius range of 21-22 mm on the second information layer 6 is initialized by a defocus amount larger than +3 μm, which is an appropriate defocus amount for the data area, the initialization process stops after a defocus occurs in the area of the radius 21-22 mm. When the defocus amount is set to a value closer to "just focus", the initialization does not stop due to the defocus during the process so that the initialization yield is improved. For example, it is preferable to perform the initialization process with a focal point less than +3 μm, more preferably less than or equal to +2.5 μm.

In addition, a good result is obtained when the defocus amount for the area corresponding to the BCA region is set to a value of −16.7% or more lower than the defocus amount for the data area (when the defocus amount is decreased). Note that this value range is merely determined corresponding to the structure of the disk that is used in this embodiment and the structure of the initialization device, and does not limit the effective range of the present invention. For example, the optimal range can be changed depending on the structure of the disk or the structure of the initialization device.

As described above, it is understood that yield in the initialization process is improved without a defocus during the process if different initialization conditions are used between the area of the radius 21-22 mm (the area having the same radius as the BCA region) and the area of the radius 22-59 mm (the area having the same radius as the data area on the first information layer) on the second information layer 6. More specifically, it is understood that yield in the initialization process is improved without a defocus during the process when the area of the radius 21-22 mm is initialized with the initialization condition including the laser power, the linear speed and the defocus amount being adjusted so that the laser power density in a unit area is higher than that of the initialization condition for the area of radius 22-59 mm.

Here, the reason why a defocus does not occur during the initialization is considered as follows.

The initialization process is performed by moving the laser beam a little in the radial direction for every circumference (with a little overlapping). In this embodiment, the beam diameter is 100 μm and the feed pitch is 40 μm, so the area of 60 μm in the area of 100 μm that is crystallized in the first circumference of initialization is irradiated by the initialization laser beam in the next circumference of initialization, too. It is considered that the conventional defocus in the area having the same radius as the BCA region on the second information layer 6 occurs because the reflectivity of the uninitialized portion in the BCA region is high. When the laser power density in a unit area is increased as described in this embodiment, the initialized area expands in the radial direction so that reflected light from the uninitialized portion in the BCA region decreases, resulting in a small amount of defocus.

In addition, as understood from Tables 4-6, the initialization of the second information layer 6 does not stop in the area of radius 21-22 mm if the difference in reflectivities of the initialized portions is 0.2% or more between the radius of 21.9 mm (a radial position in the area having the same radius as the BCA region) and the radius of 22.1 mm (a radial position in the data area) and if the reflectivity at the radius of 21.9 mm is higher than the other.

Here, it is considered that a distance in radial directions at about 0.2 mm does not cause a difference in reflectivities due to the film thickness distribution on each layer. Therefore, the difference in the disk reflectivities shown in Tables 4-6 is considered to be caused by a difference in the initialization conditions. For example, if the laser power density in a unit area is high, the degree of initialization increases so that the reflectivity becomes high. However, if the laser power density exceeds a certain value, the reflectivity becomes saturated. Therefore, if there is a difference in reflectivities of more than 0.2% within the radius 0.2 mm, the above-mentioned difference in reflectivities can be attributed to the difference in initialization conditions.

Note that each of the parameters including a laser power, a linear speed and a defocus amount is changed individually so that the laser power density in a unit area is changed in this embodiment. A similar result can be obtained if some of these parameters are changed concurrently so as to change the laser power density.

Note that the initialization is performed from the inner circumference to the outer circumference in this embodiment. A similar result can be obtained if the initialization is performed from the outer circumference to the inner circumference.

Third Embodiment

The technology that is described in this embodiment is for solving the above-mentioned second problem, i.e., for preventing the stopping of the initialization of the second information layer after a defocus occurs during the initialization.

When initializing the second information layer 6, the feed pitch of the initialization laser beam is changed between the area (the third area, see FIG. 1) having the same radius as the BCA region (the first area, see FIG. 1) on the first information layer 3 and the area (the fourth area, see FIG. 1) having the same radius as the data area (the second area, see FIG. 1) on the first information layer 3, so as to study the stability of the initialization. The result of the study is as follows. The disk structure and the initialization device in this embodiment are the same as in the first embodiment, so a detailed description thereof is omitted.

On the first information layer 3, the BCA region is formed in the area corresponding to the radius range of 21-22 mm by the initialization process in advance, and further the initialization is performed in the data area corresponding to the radius range of 22-59 mm.

In this embodiment, consecutively, the area corresponding to the radius range of 21-59 mm on the second information layer 6 is initialized. On this occasion, the area corresponding to the radius range of radius 21-22 mm, which is the same radius as the BCA region on the first information layer 3, is initialized by using a feed pitch that is a variation of an appropriate feed pitch for the area corresponding to the radius range of 22-59 mm determined in advance, while the area corresponding to the radius range of 22-59 mm is initialized by the appropriate feed pitch determined in advance. It is checked whether or not the initialization process of the second information layer 6 is completed without stopping.

As described in the first embodiment, the appropriate initialization condition determined for the data area on the second information layer 6 includes the defocus amount of +3 μm, the linear speed of 3 m/sec, the feed pitch of 40 μm and the laser power of 870-930 mW (900 mW is used in this embodiment).

In the initialization of the area corresponding to the radius range of 21-22 mm on the second information layer 6, the linear speed, the defocus amount and the initialization laser power are kept at constant values of 3 m/sec, +3 μm and 900 mW respectively, while the feed pitch is changed. The result is shown in Table 7.

Furthermore, Table 7 shows the reflectivities at the radial position r3=21.9 mm and the radial position r4=22.1 mm on the second information layer 6 when using each initialization condition. More specifically, the radial position r3 is located on the second information layer 6 in the area (the third area) corresponding to the BCA region (the first area) and is close to the data area (the fourth area). In addition, the radial position r4 is located on the second information layer 6 in the data area (the fourth area) and is close to the area (the third area) corresponding to the BCA region (the first area). Furthermore, there is shown the reflectivities from the radial position r3 and the radial position r4 at the wavelength of 405 nm in the mirror portion of the reflected light.

TABLE 7

| Feed pitch for radius 21-22 mm on second information layer | Initialization state | Decision | Reflectivity at radius r3 | Reflectivity at radius r4 |
|---|---|---|---|---|
| 20 μm | Initialization does not stop | O.K | 5.8% | 5.5% |

TABLE 7-continued

| Feed pitch for radius 21-22 mm on second information layer | Initialization state | Decision | Reflectivity at radius r3 | Reflectivity at radius r4 |
|---|---|---|---|---|
| 30 μm | Initialization does not stop | O.K | 5.7% | 5.5% |
| 40 μm | Initialization stops at radius 21-22 mm | N.G. | 5.5% | 5.5% |
| 50 μm | Initialization stops at radius 21-22 mm | N.G. | 5.4% | 5.5% |
| 60 μm | Initialization stops at radius 21-22 mm | N.G. | 5.3% | 5.5% |

The following fact is confirmed from Table 7.

When the area corresponding to the radius range of 21-22 mm on the second information layer 6 is initialized by a feed pitch larger than or equal to 40 μm, which is an appropriate feed pitch for the data area, the initialization process stops after a defocus occurs in the area of radius 21-22 mm. When the feed pitch is decreased to be smaller than the appropriate feed pitch for the data area, the initialization does not stop due to the defocus during the process, so initialization yield is improved. For example, it is preferable to perform the initialization process by a feed pitch smaller than 40 μm, more preferably smaller than or equal to 30 μm.

Here, the reason why a defocus does not occur during the initialization is considered in the same way as described in the second embodiment. Namely, it is considered that when the feed pitch is decreased, reflected light from the uninitialized portion in the BCA region decreases, resulting in a small amount of defocus.

In addition, a good result is obtained when the feed pitch for the area corresponding to the BCA region is set to a value lower than minus 25% of a feed pitch of the initialization laser beam for the data area (when the feed pitch is decreased). Note that this value range is merely determined corresponding to the structure of the disk that is used in this embodiment and the structure of the initialization device, and does not limit the effective range of the present invention. For example, the optimal range can be changed depending on the structure of the disk or the structure of the initialization device.

In addition, as understood from Table 7, the initialization of the second information layer 6 does not stop in the area of radius 21-22 mm if the difference in reflectivities of the initialized portions is 0.2% or more between the radius of 21.9 mm (a radial position in the area having the same radius as the BCA region) and the radius of 22.1 mm (a radial position in the data area) and if the reflectivity at the radius of 21.9 mm is higher than the other.

Here, it is considered that a distance in radial directions at about 0.2 mm does not cause a difference in reflectivities due to the film thickness distribution on each layer. Therefore, the difference in the disk reflectivities shown in Table 7 is considered to be caused by a difference in the initialization conditions. For example, a small feed pitch means that the portion that is once initialized (a crystallized portion) is given laser power again so that the degree of the initialization is increased. As a result, the reflectivity becomes high. If there is a difference in reflectivities of more than 0.2% within the radius 0.2 mm, the above-mentioned difference in reflectivities can be attributed to the difference in initialization conditions.

Note that the initialization is performed from the inner circumference to the outer circumference in this embodiment. A similar result can be obtained if the initialization is performed from the outer circumference to the inner circumference.

In addition, when viewing the disk used in this embodiment by an optical microscope, the pitch of a stripe pattern due to a difference between initialized states appears to be different depending on the feed pitch of the initialization condition. This stripe pattern is generated by a difference in initialization degrees due to overlapping of the initialization laser beam. In this way, the difference in feed pitch can be seen as the difference in the stripe pattern by using an optical microscope.

Variations of the First Through the Third Embodiments

The techniques described in the first through the third embodiments can be used independently of each other or can be used in combination. More specifically, the first information layer 3 may be initialized by the technique described in the first embodiment, while the second information layer 6 may be initialized by the technique described in the second or the third embodiment.

In addition, the above embodiments are described about the initialization of a disk having two information layers. However, it is possible to apply the present invention to the initialization of a disk having more information layers.

The optical information recording medium and the method for manufacturing the medium according to the present invention is useful for improving productivity in initialization of a single sided multilayered optical disk.

What is claimed is:

1. A method for manufacturing an optical information recording medium including a disk-like substrate and an information layer formed on the substrate, the information layer including a BCA which comprises a plurality of band-like portions having different reflectivities, extending in the radial direction, and being arranged like a bar code, the method comprising:

a first area initialization process for forming the BCA while initializing a first area, that is an area corresponding to the radius range of r1-r2 on the information layer, by providing initialized portions and uninitialized portions in the first area in accordance with a first initialization condition including at least one of a laser power, a linear speed and a focal point of the laser beam for the information layer; and a second area initialization process for initializing a second area, that is an area other than the first area on the information layer, in accordance with a second initialization condition that is different from the first initialization condition, including at least one of a laser power, a linear speed and a focal point of the laser beam for the information layer.

2. The method according to claim 1, wherein
the optical information recording medium includes a plurality of information layers and a transparent layer formed on the disk-like substrate in this order, and also includes an optical separation layer between the plurality of information layers,
each of the plurality of information layers includes at least a recording layer that generates a reversible change between an amorphous phase and a crystalline phase by irradiation with the laser beam, the reversible change being optically detectable, and
at least one of the plurality of information layers has the BCA.

3. The method according to claim 1, wherein a laser power of the first initialization condition for initializing the first area is lower than a laser power of the second initialization condition.

4. The method according to claim 1, wherein a linear speed of the first initialization condition for initializing the first area is higher than a linear speed of the second initialization condition.

5. The method according to claim 1, wherein a focal point of the first initialization condition for initializing the first area is farther from the information layer than a focal point of the second initialization condition.

6. The method according to claim 1, wherein the optical information recording medium satisfies inequalities Ra1>Ra2 and Rc1<Rc2, where Ra1 and Rc1 respectively denote reflectivities in the amorphous state and in the crystalline state of the first information layer at a wavelength of the laser beam for crystallization, while Ra2 and Rc2 respectively denote reflectivities in the amorphous state and in the crystalline state of the second information layer at a wavelength of the laser beam for crystallization, the first information layer being an information layer with the BCA, the second information layer being an information layer without the BCA.

7. The method according to claim 6, wherein the first information layer and the second information layer are initialized by using one optical head in the order of the first information layer and then the second information layer.

8. A method for manufacturing an optical information recording medium including a disk-like substrate and a plurality of information layers formed on the substrate, the plurality of information layers including a first information layer that includes a BCA which comprises a plurality of band-like portions having different reflectivities, extending in the radial direction, and being arranged like a bar code, the method comprising:
a third area initialization process for initializing a third area on a second information layer in accordance with a third initialization condition, the third area being an area corresponding to the radius range of r1-r2 on the second information layer, the second information layer being an information layer without the BCA which is formed by providing initialized portions and uninitialized portions in the radius range of r1-r2 on the first information layer, and the third initialization condition including at least one of a laser power, a linear speed, a focal point of the laser beam for the second information layer and a feed pitch of the laser beam; and
a fourth initialization process for initializing a fourth area, that is an area other than the third area on the second information layer, in accordance with a fourth initialization condition that is different from the third initialization condition in at least one of a laser power, a linear speed, a focal point of the laser beam for the second information layer and a feed pitch of the laser beam.

9. The method according to claim 8, wherein a laser power of the third initialization condition for initializing the third area is higher than a laser power of the fourth initialization condition.

10. The method according to claim 8, wherein a linear speed of the third initialization condition for initializing the third area is lower than a linear speed of the fourth initialization condition.

11. The method according to claim 8, wherein a focal point of the third initialization condition for initializing the third area is closer to the second information layer than a focal point of the fourth initialization condition.

12. The method according to claim 8, wherein a feed pitch of the third initialization condition for initializing the third area is smaller than a feed pitch of the fourth initialization condition.

13. The method according to claim 8, wherein the optical information recording medium satisfies inequalities Ra1>Ra2 and Rc1<Rc2, where Ra1 and Rc1 respectively denote reflectivities in the amorphous state and in the crystalline state of the first information layer at a wavelength of the laser beam for crystallization, while Ra2 and Rc2 respectively denote reflectivities in the amorphous state and in the crystalline state of the second information layer at a wavelength of the laser beam for crystallization, the first information layer being an information layer with the BCA, the second information layer being an information layer without the BCA.

14. The method according to claim 13, wherein the first information layer and the second information layer are initialized by using one optical head in the order of the first information layer and then the second information layer.

15. An optical information recording medium comprising a disk-like substrate and an information layer formed on the substrate, the information layer including a BCA which comprises a plurality of band-like portions having different reflectivities, extending in the radial direction, and being arranged like a bar code, wherein
the BCA is formed by providing initialized portions and uninitialized portions in a first area that is an area corresponding to the radius range of r1-r2 on the information layer, and
reflectivities are different between radial positions r3 and r4 on the information layer where r3 denotes a radial position of an initialized portion in the first area and close to a second area that is an area other than the first area on the information layer, and r4 denotes a radial position of an initialized portion in the second area and close to the first area.

16. The optical information recording medium according to claim 15, comprising:
a disk-like substrate;
a plurality of information layers formed on the substrate and having at least a recording layer that generates an optically detectable reversible change between an amorphous phase and a crystalline phase by irradiation with the laser beam;
an optical separation layer disposed between the plurality of information layers; and
a transparent layer formed on the plurality of information layers, wherein
one of the plurality of information layers has the BCA.

17. The optical information recording medium according to claim 15, wherein a reflectivity at the radial position r3 on the information layer having the BCA is lower than a reflectivity at the radial position r4 on the same information layer.

18. The optical information recording medium according to claim 15, wherein the first area and the second area are initialized respectively by initialization conditions having different values of at least one of a laser power, a linear speed and a focal point of the laser beam for the information layer.

19. The optical information recording medium according to claim 18, wherein a laser power of the initialization condition for initializing the first area is lower than a laser power of the initialization condition for initializing the second area.

20. The optical information recording medium according to claim 18, wherein a linear speed of the initialization condition for initializing the first area is higher than a linear speed of the initialization condition for initializing the second area.

21. The optical information recording medium according to claim 18, wherein a focal point of the initialization condition for initializing the first area is farther from the information layer than a focal point of the initialization condition for initializing the second area.

22. The optical information recording medium according to claim 15, wherein a difference in reflectivities between the radial positions r3 and r4 is 0.2% or more on an information layer with the BCA or an information layer without the BCA.

23. The optical information recording medium according to claim 15, wherein a difference in distances between radial positions r3 and r4 is 0.2 mm or less.

24. An optical information recording medium comprising a disk-like substrate and a plurality of information layers formed on the substrate, the plurality of information layers including a first information layer that includes BCA which comprises a plurality of band-like portions having different reflectivities, extending in the radial direction, and being arranged like a bar code, wherein
the BCA is formed by providing initialized portions and uninitialized portions in an area corresponding to the radius range of r1-r2 on the first information layer,
reflectivities are different between radial positions r3 and r4 on a second information layer that is an information layer without the BCA, where r3 denotes a radial position of an initialized portion in a third area, that is an area corresponding to the radius range of r1-r2 on the second information layer and close to a fourth area that is an area other than the third area on the second information layer, and r4 denotes a radial position of an initialized portion in the fourth area and close to the third area.

25. The optical information recording medium according to claim 24, wherein a reflectivity at the radial position r3 on the second information layer is lower than a reflectivity at the radial position r4 on the same information layer.

26. The optical information recording medium according to claim 24, wherein the third area and the fourth area are initialized respectively by initialization conditions having different values of at least one of a laser power, a linear speed, a focal point of the laser beam for the second information layer and a feed pitch of the laser beam.

27. The optical information recording medium according to claim 26, wherein a laser power of the initialization condition for initializing the third area is higher than a laser power of the initialization condition for initializing the fourth area.

28. The optical information recording medium according to claim 26, wherein a linear speed of the initialization condition for initializing the third area is lower than a linear speed of the initialization condition for initializing the fourth area.

29. The optical information recording medium according to claim 26, wherein a focal point of the initialization condition for initializing the third area is closer to the second information layer than a focal point of the initialization condition for initializing the fourth area.

30. The optical information recording medium according to claim 26, wherein a feed pitch of the initialization condition for initializing the third area is narrower than a feed pitch of the initialization condition for initializing the fourth area.

31. The optical information recording medium according to claim 24, wherein a difference in reflectivities between the radial positions r3 and r4 is 0.2% or more on an information layer with the BCA or an information layer without the BCA.

32. The optical information recording medium according to claim 24, wherein a difference in distances between radial positions r3 and r4 is 0.2 mm or less.

* * * * *